(12) United States Patent
Kim

(10) Patent No.: US 7,340,272 B2
(45) Date of Patent: Mar. 4, 2008

(54) MOBILE COMMUNICATION TERMINAL HAVING A THREE-DIMENSIONAL SURROUND SOUND EFFECT AND ITS CONTROL METHOD

(75) Inventor: Dong-Sub Kim, Gumi-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 805 days.

(21) Appl. No.: 10/682,738

(22) Filed: Oct. 10, 2003

(65) Prior Publication Data

US 2004/0142718 A1 Jul. 22, 2004

(30) Foreign Application Priority Data

Jan. 22, 2003 (KR) .................... 10-2003-0004400

(51) Int. Cl.
*H04R 5/00* (2006.01)
*H04R 29/00* (2006.01)
*H03G 3/00* (2006.01)
*H03F 21/00* (2006.01)

(52) U.S. Cl. .................. 455/550.1; 381/17; 381/1; 381/59; 381/120; 381/61; 455/575.1

(58) Field of Classification Search .............. 381/1, 381/17, 18, 300, 307, 61, 58, 59, 120, 111; 455/550.1, 575.1
See application file for complete search history.

(56) References Cited

U.S. PATENT DOCUMENTS 4,096,360 A * 6/1978 Takahashi et al. ........ 369/47.16
4,486,898 A * 12/1984 Yokoya ...................... 381/15
4,491,957 A * 1/1985 Kamalski ................... 381/13
6,026,169 A * 2/2000 Fujimori .................... 381/61
6,111,958 A * 8/2000 Maher ........................ 381/17
6,658,116 B1 * 12/2003 Rychlak ..................... 381/11
6,819,939 B2 * 11/2004 Masamura ............... 455/550.1
7,139,402 B2 * 11/2006 Abe et al. ................... 381/97

* cited by examiner

Primary Examiner—Vivian Chin
Assistant Examiner—Devona E Faulk
(74) Attorney, Agent, or Firm—Roylance, Abrams, Berdo & Goodman, L.L.P.

(57) ABSTRACT

A mobile communication terminal with three-dimensional surround-sound effect system has a data processing section for coding and modulating a transmitting signal or demodulating and decoding a receiving signal, and an audio processing section for reproducing an audio signal input from the data processing section or transferring the audio signal input from a microphone to the data processing section. The audio signal has a first audio signal for one speaker and a second audio signal for the other speaker. A first audio path has a first amplifier for amplifying the first audio signal and a first delay for delaying in phase the first audio signal, and a second audio path has a second amplifier for amplifying the second audio signal and a second delay for delaying in phase the second audio signal. A voltage measurer measures the voltage of the first and second audio signals. A comparator compares the first and the second audio signals. An audio controller transfers at least one of the first audio signal and the second audio signal for audio reproduction on the basis of the voltages measured in the first and second audio signals.

7 Claims, 5 Drawing Sheets

MOBILE COMMUNICATION TERMINAL HAVING A THREE-DIMENSIONAL SURROUND SOUND EFFECT AND ITS CONTROL METHOD

PRIORITY

This application claims priority under 35 U.S.C. § 119 to an application entitled "Mobile Communication Terminal with Three-Dimensional Surround Effect and Its Control Method" filed in the Korean Intellectual Property Office on Jan. 22, 2003, and assigned Serial No. 2003-4400, the content of which application is incorporated herein by reference.

BACKGROUND OF THE INVENTION

1. Field of the Invention

The present invention relates generally to a mobile communication terminal, and more particularly to a mobile phone having a three-dimensional surround audio effect and its controlling method.

2. Description of the Related Art

In general, a mobile phone recently in wide use is designed to provide its mobile subscribers with a variety of additional functions such as music, game, or motion picture as well as conventional mobile telephone service. Using such a variety of additional functions with the mobile phones, the subscribers tend to demand better quality of service with more versatile functions, and in particular, they would prefer to enjoy listening to music with better quality of sound such as, e.g., surround effect sound on their mobile phones. In order to provide music having better sound quality on mobile phones, the mobile phones need to be equipped with one or more speakers of a predetermined optimal size or of suitably larger size. However, design rules in terms of providing small speakers for mobile phones make it very difficult to provide mobile users with better quality musical sound with larger speakers. Therefore, to provide better sound quality of music to mobile users, a three dimensional surround effect speaker system is proposed according to an embodiment of the present invention as described hereunder.

SUMMARY OF THE INVENTION

It is, therefore, an object of the present invention to provide a mobile communication terminal or mobile phone with a three-dimensional surround effect speaker system and a method for controlling the system.

It is another object of the present invention to provide a three-dimensional surround effect speaker system and a method for controlling the system, capable of providing a mobile user with an improved quality of sound using a small size speaker in a mobile communication terminal or mobile phone.

According to one embodiment of the present invention, a mobile communication terminal is provided with a three-dimensional surround-sound effect system, the mobile communication terminal having a data processing section for coding and modulating a transmitted signal or demodulating and decoding a received signal, and having an audio processing section for reproducing an audio signal input from the data processing section or transferring the audio signal input from a microphone to the data processing section, the audio signal comprises a first audio signal fed to a first speaker and a second audio signal fed to a second speaker, wherein the surround-sound effect system comprises a first audio path adapted to include a first amplifier for amplifying the first audio signal and a first delay for delaying in phase the first audio signal; a second audio path adapted to include a second amplifier for amplifying the second audio signal and a second delay for delaying in phase the second audio signal; a voltage measurer for providing a measurement of a voltage of the first and second audio signals; a comparator for providing a comparison between the first and the second audio signals to render comparative information; and an audio controller configured to control a selection to either one of the first audio path and the second audio path on a basis of the voltages each measured in the first and second audio signals, and to transfer at least one of the first audio signal and the second audio signal for audio reproduction in at least one of the first and second speakers.

Preferably, in the mobile communication terminal, the surround-effect sound system comprises a buffer coupled with the audio controller, for temporarily storing the first and second audio signals.

According to another embodiment of the present invention, a method for controlling a three-dimensional surround-sound effect system in a mobile communication terminal is provided, the surround-sound effect system having a first audio path defined by a first amplifier for amplifying the first audio signal and a first delay for delaying in phase the first audio signal, a second audio path defined by a second amplifier for amplifying the second audio signal and a second delay for delaying in phase the second audio signal, and an audio controller coupled with the first audio path and the second audio path, wherein the method comprises the steps of receiving comparative information generated from a comparison between voltages in the first audio signal and the second audio signal; and determining either one of the first audio path and the second audio path on a basis of the comparative information of the voltages each measured in the first and second audio signals, and transferring at least one of the first audio signal and the second audio signal for audio reproduction through at least one of the first and second speakers.

Preferably, the comparative information corresponds to data obtained from a comparison between the measured voltages of the first and second audio signals.

More preferably, the controlling step further comprises the steps of, if the voltage of first audio signal is higher than that of the second audio voltage, amplifying the first audio signal via the first audio path and delaying the second audio signal via the second audio path, and if the voltage of the first audio signal is lower than that of the second audio voltage, amplifying the second audio signal via the second audio path and delaying the first audio signal via the first audio path.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

An embodiment of the present invention will be described herein below with reference to the accompanying drawings. In the following description of the present invention, a detailed description of known functions and configurations incorporated herein will be omitted for conciseness.

Figure 1:
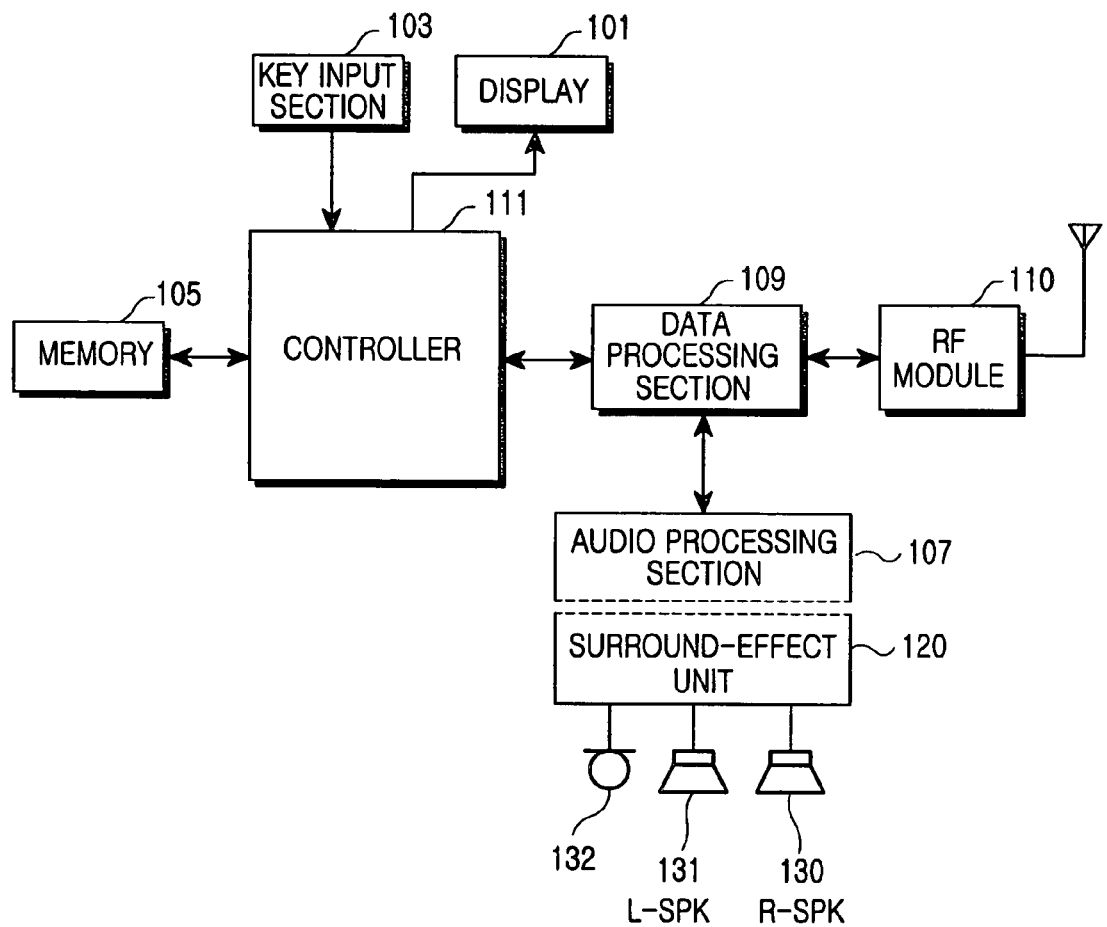
FIG. 1 is a block diagram illustrating an example of an electrical construction in a mobile phone according to an embodiment of the present invention.
Figure 2:
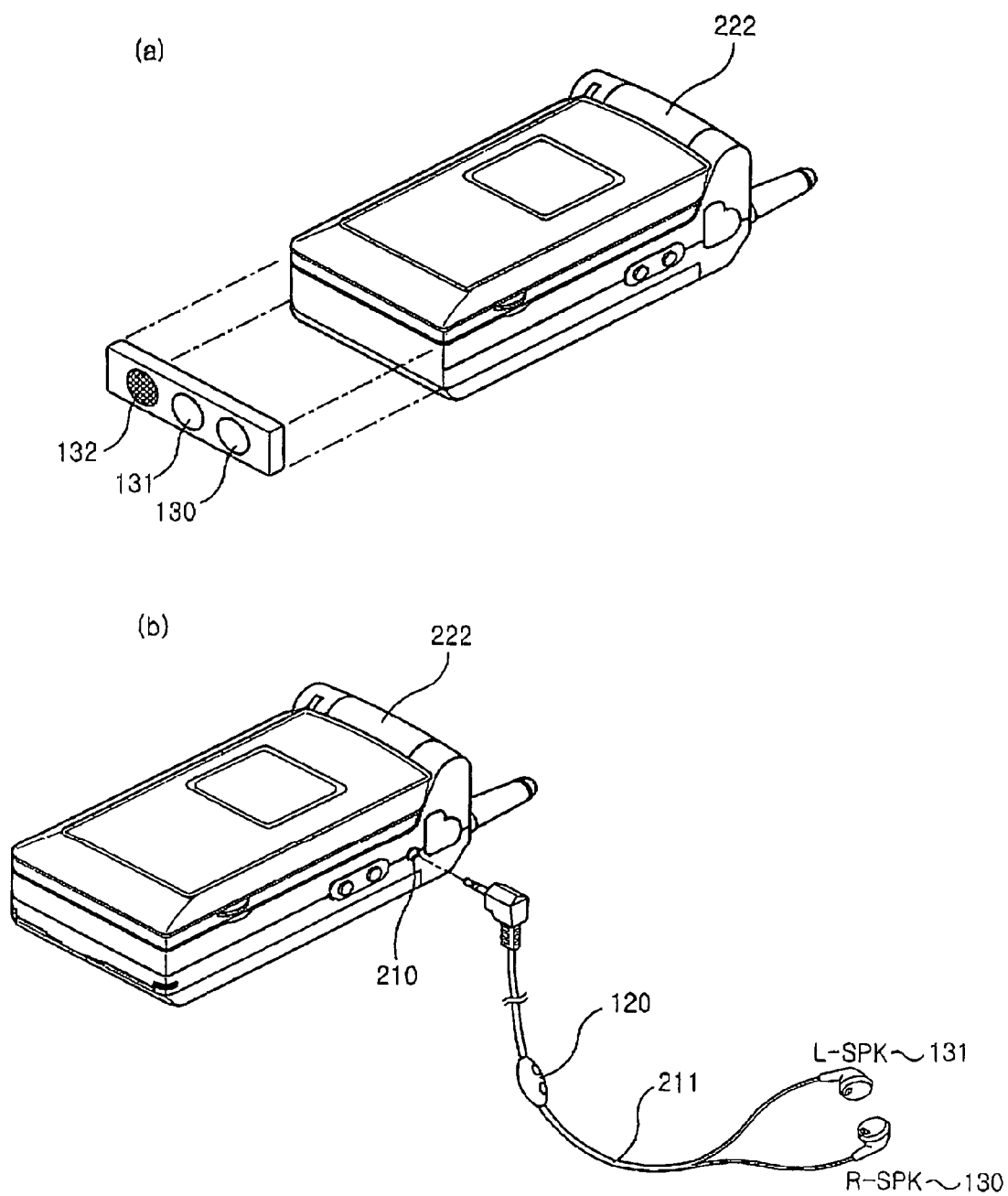
FIGS. 2A and 2B each are perspective block diagrams illustrating examples of various arrangements of a surround effect portion in a mobile phone according to an embodiment of the present invention.

Referring now to FIG. 1, which is a block diagram illustrating an example of an electrical circuit construction in a mobile phone according to an embodiment of the present invention, and FIGS. 2A and 2B, which are perspective block diagrams illustrating examples of various arrangements conceived of a surround effect portion for use in the mobile phone according to an embodiment of the present invention. The mobile phone is adapted to include therein a controller 111, a key input section 103, a display 101, a memory 105, a data processing section 109, an audio processing section 107, a surround-effect unit 120, and an RF module 110.

The (RF) Radio Frequency module 110 coupled to an antenna serves to perform all the operations associated with transmission of a radio frequency signal in the mobile phone. The RF module 110 includes an RF transmitter (not shown) for up-converting a transmitting signal into a suitable radio frequency and amplifying the signal to a proper signal level, and an RF receiver (not shown) for amplifying a receiving signal from the antenna and reducing the noise level and down-converting the received signal to a given frequency. The data processing section 109 includes a transmitting circuit (not shown) for coding and modulating the transmitting signal, and a receiving circuit (not shown) for demodulating and decoding the receiving signal from the RF module 110. Preferably, the data processing section 109 may comprise one or more MODEMs and CODECs as required. The audio processing section 107 serves to reproduce a received audio signal from the received signal output from the data processing section 109 or to transfer a transmitted audio signal from a microphone 132 to the data processing section 109. The audio processing section 107 also serves to separate the received audio signal into two audio signals, e.g., a right audio signal for one speaker and a left audio signal for the other speaker and then transfers these two separated audio signals to the surround-effect unit 120.

The surround-effect unit 120 is coupled with a plurality of speakers including at least a right speaker (R-SPK) and a left speaker (L-SPK) adapted to reproduce the right audio signal or left audio signal delivered from the audio processing section 107, respectively. It is appreciated that the surround-effect unit 120 may be implemented in either an outer or an inner part of the mobile phone. When the surround-effect unit 120 is arranged in the outer part of the mobile phone, one of the arrangements may be implemented as shown in FIGS. 2A and 2B, by way of example. Referring to FIG. 2A, the surround-effect unit includes a microphone 132, a right speaker 130 and a left speaker 131, electrically connectable to the mobile phone 222. Further, referring to FIG. 2B, it is shown that the surround-effect unit 120 may advantageously be inserted into an earphone line 211 via an input 210 disposed on a portion of the mobile phone 222.

Referring to FIG. 1, the key input section 103 is provided with a key pad including a plurality of data input keys for inputting selected numeric and character information by a mobile user and a variety of function keys for setting a desired function to be enabled in the mobile phone. The key input section also includes a set of call start/end keys for directing the start or end of a phone call operation in the mobile phone. The memory 105 includes at least one program memory for storing a control program to direct all the operations in the mobile phone or any other supplied programs such as those for use in the reproduction of specified music files, and a data memory for temporarily storing all the user data generated while the mobile phone is being used including various data files such as music files.

The controller 111 includes a central processing unit (not shown) to control all the call/service operations performed in the mobile phone. The controller 111 may be implemented to incorporate therein the data processing section 109 depending upon design needs in manufacturing. Further, the controller serves to control input of a right-audio signal and left-audio signal to the surround-effect unit 120. The display 101 provides a display of a series of messages generated during the instructed operation of the mobile phone, under the control of the controller 111.

Figure 3:
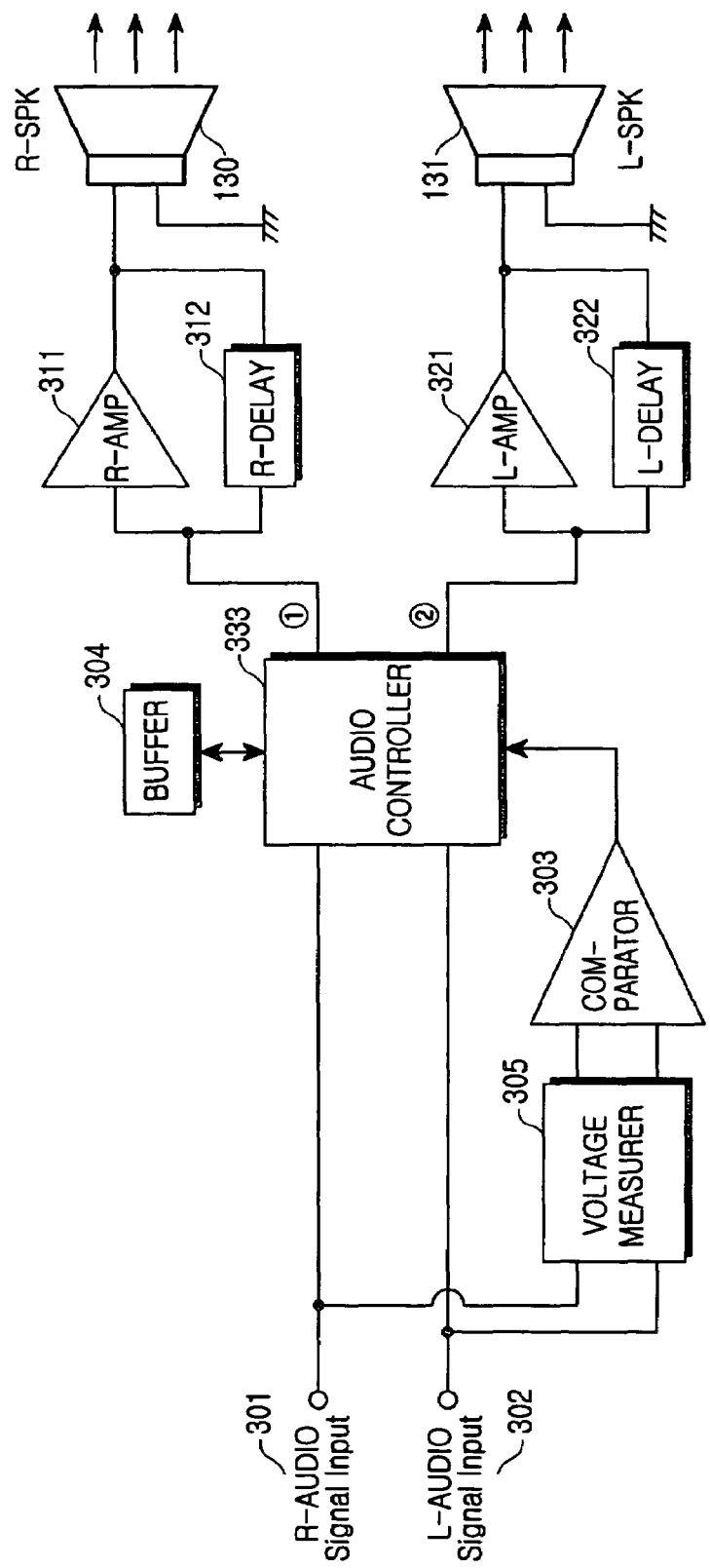
FIG. 3 is a block diagram illustrating an example of an electrical construction of a surround effect portion in a mobile phone according to an embodiment of the present invention.

Referring now to FIGS. 1 and 3, an electrical connection and overall operation of the surround-effect unit 120 in the mobile phone according to an embodiment of the present invention is described. The surround-effect unit includes audio controller 333, buffer 304, comparator 303, voltage measurer 305, right amplifier 311, right delay 312, left amplifier 321, left delay 322, right speaker 130, and left speaker 131. It is assumed that both the right audio signal 301 and the left audio signal 302 are continuously input to the surround-effect unit 120.

The voltage measurer 305 measures voltages in the right and left audio signals 301 and 302 each supplied from the audio processing section 107, as is known to those skilled. A detailed description relative to a method for measuring those voltages is omitted for conciseness. The comparator 303 compares the voltages measured from the right and left audio signals 301 and 302 to thereby provide the audio controller 333 with voltage comparative information. Here, the voltage comparative information will refer to the result of voltage comparison between both the right and left audio signals 301 and 302 in the voltage measurer 305, which consists of three types of comparative information, e.g., a first case that the voltage in the right audio signal 301 is larger than that of the left audio signal 302, a second case that the voltage in the right audio signal is smaller than that of the left audio signal, and a third case that the voltage in the right audio signal is substantially the same as that of the left audio signal. According to the comparative information, in the first case, the voltage in the right audio signal 301 being larger than that of the left audio signal 302 means that the right audio signal may have better sound quality than the left audio signal. Similarly, in the second case, the voltage in the right audio signal being smaller than that of the left audio signal means that the left audio signal 302 may have better sound quality than the right audio signal 301. Further, in the third case, the voltage in the right audio signal being substantially the same as that of the left audio signal means that the left audio signal 302 may have substantially the same or similar sound quality as the right audio signal 301.

The buffer 304 serves to temporarily store the right and left audio signals input to the audio controller 333, for buffering interruption of signals that may occur in the course of processing the right and left audio signals in the surround-effect unit 120.

The right amplifier 311 serves amplify the right audio signal 301 input from the audio controller 333 and transfer the amplified audio signal to the right speaker 130. The right delay 312 delays the right audio signal 301 from the audio controller 333 to the right speaker 130 for a given time duration, wherein the above audio signal path from the audio controller 333 via the right amplifier 311 and the right delay 312 through the right speaker is referred to as a first path. The left amplifier 321 serves to amplify the left audio signal 302 input from the audio controller 333 and transfer the amplified audio signal to the left speaker 131. Likewise, the left delay 322 delays the left audio signal 302 from the audio controller 333 to the left speaker 131 for a given time duration, wherein this audio signal path from the audio controller 333 via the left amplifier 321 and the left delay 322 through the left speaker is referred to as a second path.

Therefore, the right speaker 130 will reproduce the right audio signal 301 amplified through the right amplifier 311 and the delayed right audio signal via the right delay 312. Likewise, the left speaker 131 reproduces the left audio signal 302 amplified through the left amplifier 321 and the delayed left audio signal via the left delay 322. The audio controller 333 will be described in more detail with reference to FIGS. 4 and 5, hereunder.

Figure 4:
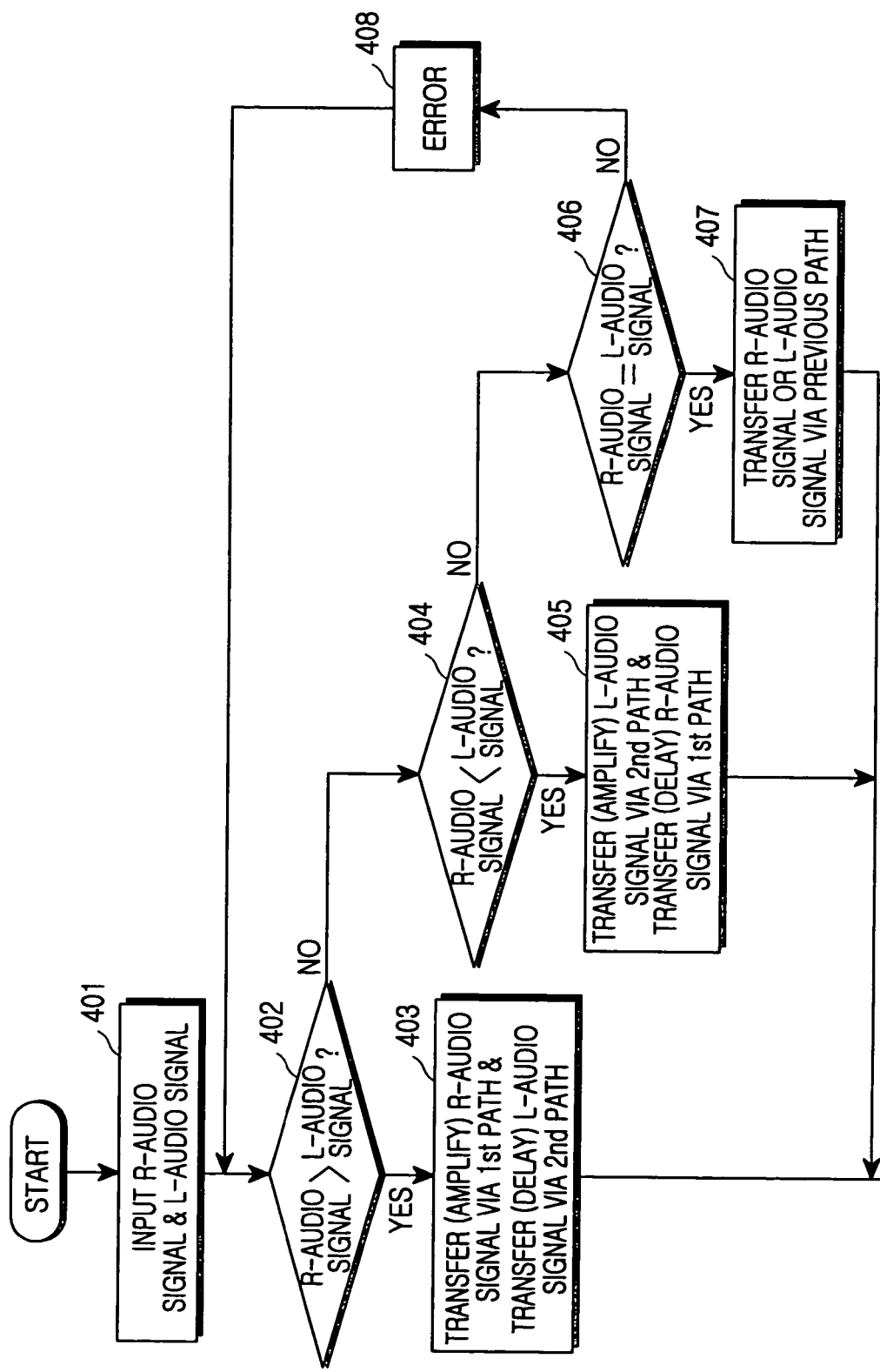
FIG. 4 is a flow chart diagram illustrating an example of a control procedure operating in an audio controller of a mobile phone according to an embodiment of the present invention.
Figure 5:
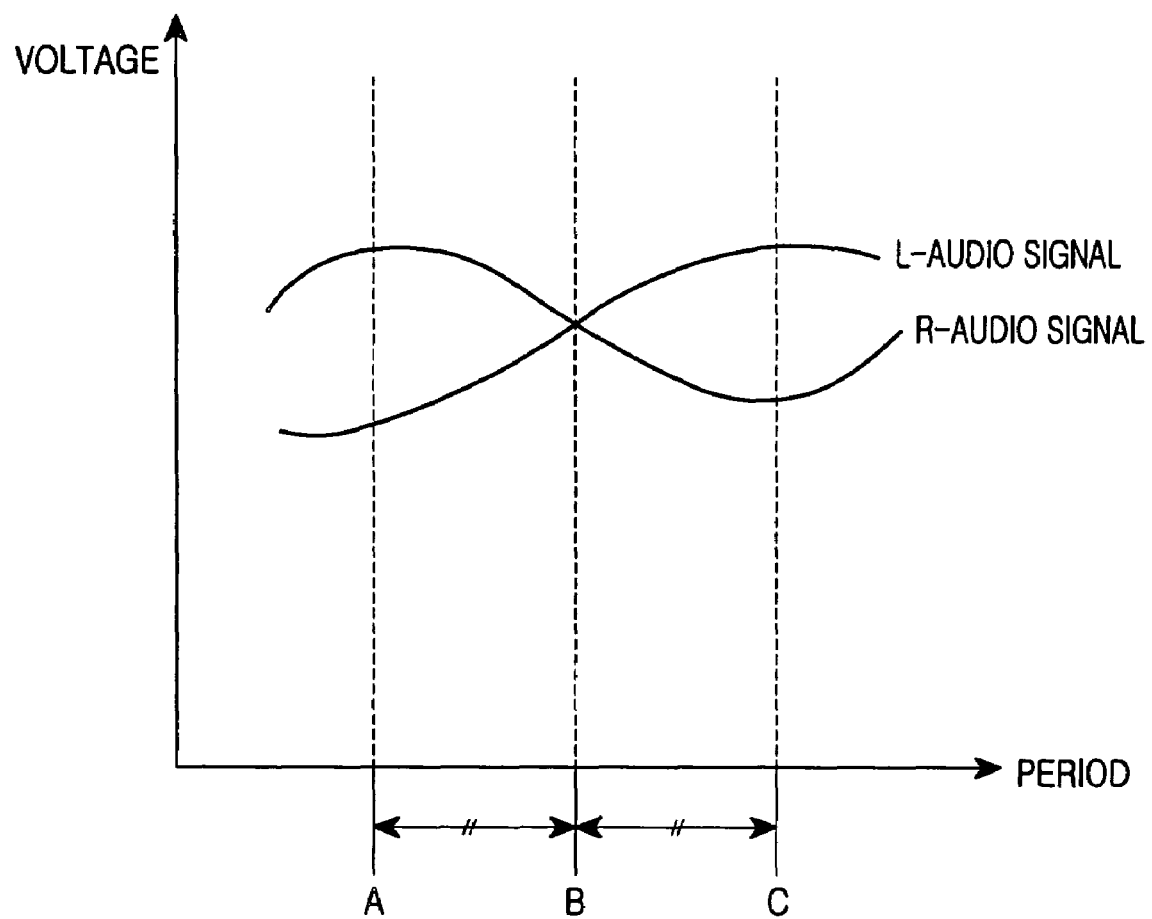
FIG. 5 is a graph diagram illustrating an example of a comparison in between a right audio signal and a left audio signal output in a comparator of the surround effect section in a mobile phone according to an embodiment of the present invention.

FIG. 4 is a flow chart illustrating an example of a control procedure operating in the audio controller of the mobile phone according to an embodiment of the present invention. FIG. 5 is a graph illustrating a comparison between the right audio signal and the left audio signal outputs in the surround-effect unit of the mobile phone according to an embodiment of the present invention. In FIG. 5, the waveforms shown in graphic form do not designate the actual input voltage of the right and left audio signals 301 and 302, but it illustrates waveforms of the two audio signals by way of example to provide a better understanding of the invention, wherein x-axis designates a period and y-axis designates a voltage. Generally, it is understood by those skilled in the art that the above period in x-axis significantly affects the quality of sound in design of these systems, that is to say, the shorter the period becomes (e.g., an interval between A and B, or B and C in FIG. 5), the better the quality of sound being provided to the ears of the listener, while the longer the period becomes, the worse the quality of sound provided to the ears of the listener.

According to the flow chart of FIG. 4, in step 401, the audio controller 333 stores the right audio signal 301 and the left audio signal 302 input from the audio processing section 107 in buffer 304. Then, in step 402, the audio controller 333 receives comparative information data from the comparator 303 to determine whether a voltage in the right audio signal 301 is larger than that in the left audio signal 302. As a result of the determination, the method proceeds to step 404 if the voltage in the right audio signal 301 is not larger than that in the left audio signal 302, and proceeds to step 403 if the voltage in the right audio signal 301 is larger than that in the left audio signal 302. If the voltage in the right audio signal 301 is larger than that of the left audio signal 302, the right audio signal may have better sound quality than the left audio signal. It is assumed that a series of comparison operations for generating the comparative information data using the comparator 303, are performed in the specified time periods such as A, B, C as illustrated in FIG. 5. According to the illustrated embodiment of the invention, the voltage of the right audio signal 301 at time point A is larger than that in the left audio signal 302. The voltage of the right audio signal 301 at time point C is smaller than that in the left audio signal 302, while the voltage of the right audio signal 301 at time point B is substantially the same as that in the left audio signal 302.

In step 403, the audio controller 333 transfers the right audio signal 301 to the right amplifier 311 via the first path, and transfers the left audio signal 302 to the left delay 322 via the second path. That is, the audio controller amplifies the right audio signal with better sound quality than the left audio signal, thereby enabling reproduction of the right audio signal in the right speaker 130, while the controller 333 delays in phase the left audio signal having worse sound quality than the right audio signal, thereby enabling reproduction of the left audio signal in the left speaker 131. Therefore, the audio controller 333 amplifies the right audio signal 301 having comparatively better sound quality than the left audio signal, for reproduction in the right speaker 130, while delaying in phase the left audio signal having comparatively worse sound quality than the right audio signal, for delayed reproduction in the left speaker 131, with a view to effecting the intended three-dimensional surround effect to the ears of the mobile subscriber.

Similarly, in step 404, the audio controller 333 also receives comparative information data from the comparator 303 to determine whether a voltage in the right audio signal 301 is smaller than that in the left audio signal 302. As a result of the determination, the method proceeds to step 406 if the voltage in the right audio signal 301 is not smaller than that in the left audio signal 302, and proceeds to step 405 if the voltage in the right audio signal 301 is smaller than that in the left audio signal 302. If the voltage in the right audio signal 301 is smaller than that of the left audio signal 302, the right audio signal may have worse sound quality than the left audio signal. According to this embodiment, the comparative information data is generated in the comparator 303 between the right audio signal voltage 301 and the left audio signal voltage 302, at the time point C of FIG. 5.

In step 405, the audio controller 333 transfers the left audio signal 301 to the left amplifier 321 via the second path, and transfers the right audio signal 302 to the right delay 312 via the first path. That is, the audio controller 333 amplifies the left audio signal having better sound quality than the right audio signal, thereby enabling reproduction of the left audio signal in the left speaker 131, while it delays in phase the right audio signal having worse sound quality than the left audio signal, thereby enabling reproduction of the right audio signal in the right speaker 130. Therefore, the audio controller 333 amplifies the left audio signal 302 having comparatively better sound quality than the right audio signal, for reproduction in the left speaker 130, while delaying in phase the right audio signal having comparatively worse sound quality than the left audio signal, for delayed reproduction in the right speaker 131, with a view to effecting the intended three-dimensional surround effect to the ears of the mobile subscriber.

In a similar manner, in step 406, the audio controller 333 also receives comparative information data from the comparator 303 to determine whether a voltage in the right audio signal 301 is substantially the same as that in the left audio signal 302. As a result of the determination, the method proceeds to step 408 only if the voltage in the right audio signal 301 is not same as that in the left audio signal 302, while to step 407 if the voltage in the right audio signal 301 is the same as that in the left audio signal 302. In the step 407, the audio controller 333 transfers the right or left audio signal through the first or second path specified in the preceding step. That is to say, if it is determined in step 406 that the voltage in the right audio signal 301 is substantially the same as that in the left audio signal 302, the audio controller 333 makes no significant decision as to which audio signal is selected to be amplified through either the first path or the second path in the surround-effect unit or which audio signal is to be delayed in phase.

Therefore, the audio signal reproduction in these steps may differ from each other depending upon which audio signal has been amplified or which audio signal has been delayed in the preceding stage. This operation may be accomplished by determination as to which one of the right audio signal 301 and the left audio signal 302 has the higher voltage. For instance, provided that in the preceding stage the voltage of the right audio signal 301 is higher than that of the left audio signal 302, then the audio controller 333 amplifies and reproduces the right audio signal 301 having better sound quality than the left audio signal 302 and provides a phase delay to the left audio signal 302 having lower sound quality than the right audio signal 301. Similarly, provided that in the preceding stage the voltage of the left audio signal 302 is higher than that of the right audio signal 301, then the audio controller 333 amplifies and reproduces the left audio signal 302 having better sound quality than the right audio signal 301 and provides a phase delay to the right audio signal 301 having lower sound quality than the left audio signal 302, thereby effecting reproduction of the three-dimensional surround-effect sound through the right and left speakers of the mobile phone.

In the step 408, the audio controller 333 makes a determination that the comparative information from the comparator 303 has an error incapable of judgment or an interrupt situation has occurred during the operation of the audio controller 333 and then returns the control to the aforementioned preceding step 402. Here, the audio processor transfers the right and left audio signals temporarily stored in the buffer 304 into the voltage measurer 305. The voltage measurer 305 again measures a voltage of the right and left audio signals delivered from the buffer 304.

As understood from the foregoing description, the present invention will implement a three-dimensional surround effect speaker system and a method for controlling the system, with a view to providing a mobile user with more improved sound quality using the smaller size of speakers in a mobile communication terminal or mobile phone.

While the invention has been shown and described with reference to a certain embodiment thereof, it will be understood by those skilled in the art that various changes in form and details may be made therein. Therefore, the scope of the invention should not be limited by the described embodiment, but should be defined by the appended claims and equivalents thereof.

What is claimed is:

1. A mobile communication terminal with a three-dimensional surround-sound effect system, the mobile communication terminal having a data processing section for coding and modulating a transmitting signal or demodulating and decoding a receiving signal, and having an audio processing section for reproducing an audio signal input from the data processing section or transferring the audio signal input from a microphone to the data processing section, said audio signal comprising a first audio signal fed to first speaker and a second audio signal fed to a second speaker, both of which being coupled with the audio processing section, said surround-effect sound system comprising:

a first audio path adapted to include a first amplifier for amplifying the first audio signal and a first delay for delaying in phase the first audio signal;

a second audio path adapted to include a second amplifier for amplifying the second audio signal and a second delay for delaying in phase the second audio signal;

a voltage measurer for making a measurement to a voltage of the first and second audio signals;

a comparator for making a comparison between the voltages of the first and the second audio signals to render comparative information; and an audio controller configured to transmit an audio signal having a large voltage to an amplifier of a first corresponding audio path and transmit an audio signal having a small voltage to a delay of a second corresponding audio path wherein the amplifier and the delay are not part of the same path, according to the comparative information.

2. The mobile communication terminal as claimed in claim 1, wherein the surround-effect sound system comprises a buffer coupled with the audio controller, for temporarily storing the first and second audio signals.

3. The mobile communication terminal as claimed in claim 1, wherein the audio controller determines whether at least one of the comparative information is incorrect and an interrupt has occurred in system processing, and measuring the voltage of the right audio signal and the left audio signal with the voltage measurer if at least one of the comparative information is incorrect and an interrupt has occurred in the system processing.

4. A method for controlling a three-dimensional surround-sound effect system in a mobile communication terminals, comprising the steps of:

defining a first audio path for amplifying the first audio signal and a first delay for delaying in phase the first audio signal, defining a second audio path defined for amplifying the second audio signal and a second delay for delaying in phase the second audio signal;

receiving comparative information generated from a comparison between voltages in the first audio signal and the second audio signal; and transmitting an audio signal having a large voltage to an amplifier of a first corresponding audio path and transmitting an audio signal having a small voltage to a delay of a second corresponding audio path wherein the amplifier and the delay are not part of the same path, according to the comparative information.

5. The method as claimed in claim 4, wherein the comparative information corresponds to data obtained from a comparison between the measured voltages of the first and second audio signals.

6. The method as claimed in claim 4, wherein said controlling step further comprises the steps of:
   if the voltage of first audio signal is higher than that of the second audio voltage, then controlling to amplify the first audio signal via the first audio path and to delay the second audio signal via the second audio path; and
   if the voltage of first audio signal is lower than that of the second audio voltage, then controlling to amplify the second audio signal via the second audio path and to delay the first audio signal via the first audio path.

7. The method as claimed in claim 4, wherein said controlling step further comprises the steps of:
   determining whether at least one of the comparative information is incorrect and an interrupt has occurred in system processing; and
   measuring the voltage of the first and second audio signals if at least one of the comparative information is incorrect and an interrupt has occurred in the system processing.

\* \* \* \* \*